US011017125B2

(12) United States Patent
Stitt et al.

(10) Patent No.: US 11,017,125 B2
(45) Date of Patent: May 25, 2021

(54) UNIQUIFIED FPGA VIRTUALIZATION APPROACH TO HARDWARE SECURITY

(71) Applicant: University of Florida Research Foundation, Incorporated, Gainesville, FL (US)

(72) Inventors: Greg M. Stitt, Gainesville, FL (US); Kai Yang, Gainesville, FL (US); Swarup Bhunia, Gainesville, FL (US); Robert A. Karam, Temple Terrace, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 238 days.

(21) Appl. No.: 15/838,526

(22) Filed: Dec. 12, 2017

(65) Prior Publication Data

US 2018/0165478 A1 Jun. 14, 2018

Related U.S. Application Data

(60) Provisional application No. 62/433,552, filed on Dec. 13, 2016.

(51) Int. Cl.
*G06F 21/76* (2013.01)
*G06F 12/14* (2006.01)
(Continued)

(52) U.S. Cl.
CPC .............. *G06F 21/76* (2013.01); *G06F 21/75* (2013.01); *G06F 30/34* (2020.01); *G09C 1/00* (2013.01);
(Continued)

(58) Field of Classification Search
CPC .......... G06F 17/5054; G06F 2015/768; G06F 21/75; G06F 21/76; G06F 3/0662;
(Continued)

(56) References Cited

U.S. PATENT DOCUMENTS 10,496,825 B2 * 12/2019 Lea .................... G06F 21/602
2011/0283115 A1 * 11/2011 Junod .................. H04L 9/0631
713/190

(Continued)

FOREIGN PATENT DOCUMENTS

WO WO-0227476 A1 * 4/2002 ........... G06F 9/3836

OTHER PUBLICATIONS

Coole, James, and Greg Stitt. "Fast, flexible high-level synthesis from OpenCL using reconfiguration contexts." IEEE Micro 34.1 (2013): 42-53. (Year: 2013).*

(Continued)

*Primary Examiner* — Michael Simitoski
(74) *Attorney, Agent, or Firm* — Alston & Bird LLP (57) ABSTRACT

Novel methods of virtualization with unique virtual architectures on field-programmable gate arrays (FPGAs) are provided. A hardware security method can include providing one or more field-programmable gate arrays (FPGAs), and creating an application specialized virtual architecture (or overlay) over the one or more FPGAs (for example, by providing an overlay generator). Unique bitfiles that configure the overlays implemented on the FPGAs can be provided for each deployed FPGA. The application specialized virtual architecture can be constructed using application code, or functions from a domain, to create an overlay represented by one or more hardware description languages (e.g., VHDL).

9 Claims, 4 Drawing Sheets

(51) Int. Cl.
H04L 29/06 (2006.01)
H04L 12/46 (2006.01)
G06F 21/75 (2013.01)
G09C 1/00 (2006.01)
H04L 9/00 (2006.01)
G06F 30/34 (2020.01)
G06F 9/30 (2018.01)
G06F 15/76 (2006.01)
G06F 3/06 (2006.01)

(52) U.S. Cl.
CPC .............. *H04L 9/003* (2013.01); *H04L 12/46* (2013.01); *H04L 63/0428* (2013.01); *H04L 69/12* (2013.01); *G06F 3/0662* (2013.01); *G06F 2015/768* (2013.01)

(58) Field of Classification Search
CPC ....... G09C 1/00; H04L 12/46; H04L 63/0428; H04L 69/12; H04L 9/003
See application file for complete search history.

(56) References Cited

U.S. PATENT DOCUMENTS

| | | | | |
|---|---|---|---|---|
| 2014/0068580 | A1* | 3/2014 | Anckaert | G06F 21/14 717/148 |
| 2015/0095659 | A1* | 4/2015 | Courousse | G06F 21/602 713/190 |
| 2015/0171870 | A1* | 6/2015 | Parker | H03K 19/17768 380/44 |
| 2015/0236853 | A1* | 8/2015 | Fischer | G06F 7/588 380/46 |
| 2016/0119137 | A1* | 4/2016 | Sethumadhavan | G06F 9/30178 713/190 |
| 2017/0149572 | A1* | 5/2017 | Wallrabenstein | G06F 21/34 |
| 2017/0169220 | A1* | 6/2017 | Fish | G06F 21/755 |
| 2017/0357808 | A1* | 12/2017 | Arroyo | H04L 63/1441 |
| 2019/0132113 | A1* | 5/2019 | Hettwer | G09C 1/00 |

OTHER PUBLICATIONS

Jain, Abhishek Kumar, Douglas L. Maskell, and Suhaib A. Fahmy. "Are coarse-grained overlays ready for general purpose application acceleration on fpgas?." (DASC/PiCom/DataCom/CyberSciTech). IEEE, 2016. (Year: 2016).*

Kirchgessner, Robert, Alan D. George, and Herman Lam. "Reconfigurable computing middleware for application portability and productivity." 2013 IEEE 24th International Conference on Application-Specific Systems, Architectures and Processors. IEEE, 2013. (Year: 2013).*

Koch, Dirk, Christian Beckhoff, and Guy GF Lemieux. "An efficient FPGA overlay for portable custom instruction set extensions." 2013 23rd international conference on field programmable logic and applications. IEEE, 2013. (Year: 2013).*

Ma, Sen, Zeyad Aklah, and David Andrews. "Run time interpretation for creating custom accelerators." 2016 Design, Automation & Test in Europe Conference & Exhibition (Date). IEEE, 2016. (Year: 2016).*

Stitt, Greg, and James Coole. "Intermediate fabrics: Virtual architectures for near-instant FPGA compilation." IEEE Embedded Systems Letters 3.3 (2011): 81-84. (Year: 2011).*

Wiersema, Tobias, Arne Bockhorn, and Marco Platzner. "Embedding FPGA overlays into configurable systems-on-chip: ReconOS meets ZUMA." 2014 International Conference on ReConFigurable Computing and FPGAs (ReConFig14). IEEE, 2014. (Year: 2014).*

Number of Unlabeled Strongly Connected Digraphs With N Nodes, p. 1, [online], [retrieved from the Internet Dec. 18, 2019] <URL: https://oeis.org/A035512>.

Coole et al., "Adjustable-cost overlays for runtime compilation," 2015 IEEE 23rd Annual International Symposium on Field-Programmable Custom Computing Machines, May 2015, pp. 21-24.

Coole et al., "Intermediate fabrics: virtual architectures for circuit portability and fast placement and routing," International Conference on Hardware/Software Codesign and System Synthesis, Oct. 2010, pp. 1-10.

Luis et al., "Differential power analysis countermeasures for the configuration of SRAM FPGAs," Military Communications Conference, Oct. 2015, pp. 1-8.

Coole et al., "Fast and flexible high-level synthesis from openCL using reconfiguration contexts," IEEE Micro, Oct. 2013, pp. 1-7.

Paul et al., "MAHA: an energy-efficient malleable hardware accelerator for data-intensive applications," IEEE Transactions on Very Large Scale Integration (VLSI) Systems, Sep. 2014, pp. 1-12.

Jain et al., "Efficient overlay architecture based on DSP blocks," IEEE 23rd Annual International Symposium on Field-Programmable Custom Computing Machines, May 2015, pp. 25-28.

Capalija et al., "A high-performance overlay architecture for pipelined execution of data flow graphs," 23rd International Conference on Field Programmable Logic and Applications, Sep. 2013, pp. 1-8.

Kc et al., "Countering code-injection attacks with instruction-set randomization," Proceedings of the 10th ACM Conference on Computer and Communications Security, Oct. 2003, pp. 1-10.

Wilson, David et al. *A High-Level Synthesis Scheduling and Binding Heuristic for FPGA Fault Tolerance*, International Journal of Reconfigurable Computing, vol. 2017, pp 1-17, Aug. 2017. DOI: 10.1155/2017/5419767.

Landy, Aaron et al. *A Low-Overhead Interconnect Architecture for Virtual Reconfigurable Fabrics*, in CASES'12: Proceedings of the 2012 International Conference on Compilers, Architectures and Synthesis For Embedded Systems, CASES '12, pp. 111-119, ACM, Oct. 2012, New York NY, USA.

Wilson, David et al. *A Recurrently Generated Overlay Architecture for Rapid FPGA Application Development*, in Proceedings of the 9th International Symposium on Highly-Efficient Accelerators and Reconfigurable Technologies, HEART 2018, pp. 4:1-4:6, ACM, Jun. 2018. Toronto, ON, Canada. DOI: 10.1145/3241793.3241797.

Wilson, David et al. *A Scalable, Low-Overhead Finite-State Machine Overlay for Rapid FPGA Application Development*, in International Workshop on Overlay Architectures for FPGAS (OLAF), co-located with FPGA 2017, pp. 13-18, Feb. 2017. Monterey, California, USA. ARxIV: 1705.02732v1 [cs.AR] May 8, 2017.

Stitt, Greg et al. *A Uniquified Virtualization Approach to Hardware Security*, IEEE Embedded Systems Letters, vol. 9, No. 3, pp. 53-56, Sep. 2017.

Coussy, Phillippe et al. *An Introduction to High-Level Synthesis*, IEEE Design Test of Computers, vol. 26, No. 4, pp. 8-17, Jul./Aug. 2009.

Canis, Andrew et al. *Legup: High-Level Synthesis for FPGA-Based Processor/Accelerator Systems*, ACM/SIGDA International Symposium on Field Programmable Gate Arrays (FPGA), pp. 33-36, Feb. 2011, Monterey, California, USA.

Kirchgessner, Robert et al. *Low-Overhead FPGA Middleware for Application Portability and Productivity*, ACM Transactions on Reconfigurable Technology and Systems, vol. 8, No. 4, Article 21, pp. 21:1-21:22, Sep. 2015.

Bollengier, Théotime et al. *Overlay Architectures for FPGA Resource Virtualization*, GDR SOC SIP, pp. 1-2, Jun. 2016, Nantes, France. hal-01405912.

Baylis, Austin et al. *Overlay-Based Side-Channel Countermeasures: A Case Study on Correlated Noise Generation*, in 2017 IEEE 60th International Midwest Symposium on Circuits and Systems (MWSCAS), pp. 1308-1311, Aug. 2017.

Li, Xiangwei et al. 2019. *Time-Multiplexed FPGA Overlay Architectures: A Survey*. ACM Transactions on Design Automation of Electronic Systems, vol. 24, No. 5, Article 54, pp. 54:1-54:19, Jul. 2019.

Brant, Alexander et al. *ZUMA: An Open FPGA Overlay Architecture*, 2012. IEEE 20th International Symposium on Field-Programmable Custom Computing Machines, 2012, pp. 93-96, Toronto, ON, Canada. DOI: 10.1109/FCCM.2012.25.

(56) References Cited

OTHER PUBLICATIONS

Coole, James et al. *OpenCL High-Level Synthesis for Mainstream FPGA Acceleration*, in Workshop on SoCs, Heterogeneous Architectures and Workloads. (SHAW), (20 pages), Feb. 2014. [Retrieved from the Internet Jun. 19, 2020]. <https://studylib.net/doc/5800083/opencl-if-overview---greg-stitt--university-of-florida>.

Hao, Lu et al. *Virtual Finite -State-Machine Architectures for Fast Compilation and Portability*, in 2013 IEEE $24^{th}$ International Conference on Application-Specific Systems, Architectures and Processors (ASAP), pp. 91-94, Jun. 2013.

Nane, Razvan et al. *A Survey and Evaluation of FPGA High-Level Synthesis Tools*, in IEEE Transactions on Computer-Aided Design of Integrated Circuits and Systems, vol. 35, No. 10, pp. 1591-1604, Oct. 2016. DOI: 10.1109/TCAD.2015.2513673.

\* cited by examiner

UNIQUIFIED FPGA VIRTUALIZATION APPROACH TO HARDWARE SECURITY

CROSS-REFERENCE TO RELATED APPLICATION

This application claims the benefit of U.S. Provisional Patent Application Ser. No. 62/433,552, filed Dec. 13, 2016, which is incorporated herein by reference in its entirety, including any figures, tables, and drawings.

BACKGROUND

Virtualization of software, storage, and networking are widely used technologies with well-known security benefits. Although existing techniques address many security issues for software applications and operating systems, those techniques do not provide hardware security against device tampering, counterfeiting, and side-channel attacks.

Hardware security is a rapidly increasing concern due to the emergence of Internet of Things (IoT) applications, where tampering is both easier and more damaging due to billions of widespread units. Defense applications have similar concerns, where tampering or counterfeiting could result in loss of human life and billions of dollars of research.

One common characteristic of IoT, defense, and other embedded applications is the use of field-programmable gate arrays (FPGAs), which often provide performance, power, energy, and reliability advantages over other technologies. However, FPGAs have security flaws that enable extraction of encryption keys, which allows an attacker to reverse engineer IP and modify the FPGA bitfile (i.e., tampering) for malicious purposes. Although numerous techniques have been introduced to protect against each one of these threats, current work shows that such tampering is still possible without significant effort, even on devices marketed as secure.

BRIEF SUMMARY

Embodiments of the present invention include uniquified methods for computer and hardware security. More specifically, embodiments of the present invention include novel methods of virtualization with unique virtual architectures on field-programmable gate arrays (FPGAs).

Virtualization has well-known security advantages for operating systems and software, but current techniques do not address increasingly important hardware-security concerns. For widely deployed systems (e.g., Internet of Things) and safety-critical systems (e.g., defense, automobiles), protecting against device tampering is critical, but is often difficult due to the relative ease of side-channel attacks.

Ideally, the most effective strategy for hardware security is to create a specialized FPGA or ASIC for every instance of a deployed application. With such an approach, even if a security flaw was exploited on one device, damage would be limited to that one instance as opposed to all deployed devices. Although this strategy clearly has prohibitive costs, embodiments of the present invention introduce an approach that achieves the same advantages at minimal cost by diversifying virtualized hardware across physical FPGAs. More specifically, embodiments of the present invention address these issues with novel usage of virtualization that limits damage from tampering to a single instance of a deployed system by employing unique virtual architectures (i.e., overlays) on FPGAs.

In an embodiment of the present invention, a hardware security method can include providing one or more field-programmable gate arrays (FPGAs), and creating an application specialized virtual architecture (or overlay) over the one or more FPGAs (e.g., by providing an overlay generator). Unique bitfiles that configure the overlays implemented on the FPGA can be provided for each deployed FPGA. The application specialized virtual architecture can be constructed using application code, or functions from a domain, to create an overlay represented by one or more hardware description languages (e.g., VHDL). However, it should be understood that embodiments of the present invention can automatically generate the virtual architecture.

A method according to an embodiment of the present invention can further include compiling the overlay hardware description language using FPGA CAD tools (e.g., Vivado, Quartus), resulting in an FPGA bitfile that programs the FPGA with the overlay. After generating the overlay, an application compilation tool flow can follow a set of steps including optimization, scheduling, resource allocation, binding, and mapping to create an overlay bitfile that configures the overlay with the application. The application compilation tool flow can repeat when the application is changed. An overlay tool flow can execute only once to create an initial overlay, or the overlay tool flow can execute again if application requirements change. A compiler can be provided that uses a configuration key for each FPGA (a key/device ID pair) to identify uniquifications for a particular device. The key/device ID pair should be known to only the device manufacturer, or the application manufacturer, or both. The compiler can ensure correctness of mapped applications by construction, or by being aware of the modifications made to the overlay for that device. IDs can be retrieved from the device during an update and a corresponding key can be referenced in the manufacturer's database.

DETAILED DESCRIPTION

Embodiments of the present invention include uniquified methods for hardware security. More specifically, embodiments of the present invention include novel usages of virtualization with unique virtual architectures on field-programmable gate arrays.

Figure 1A:
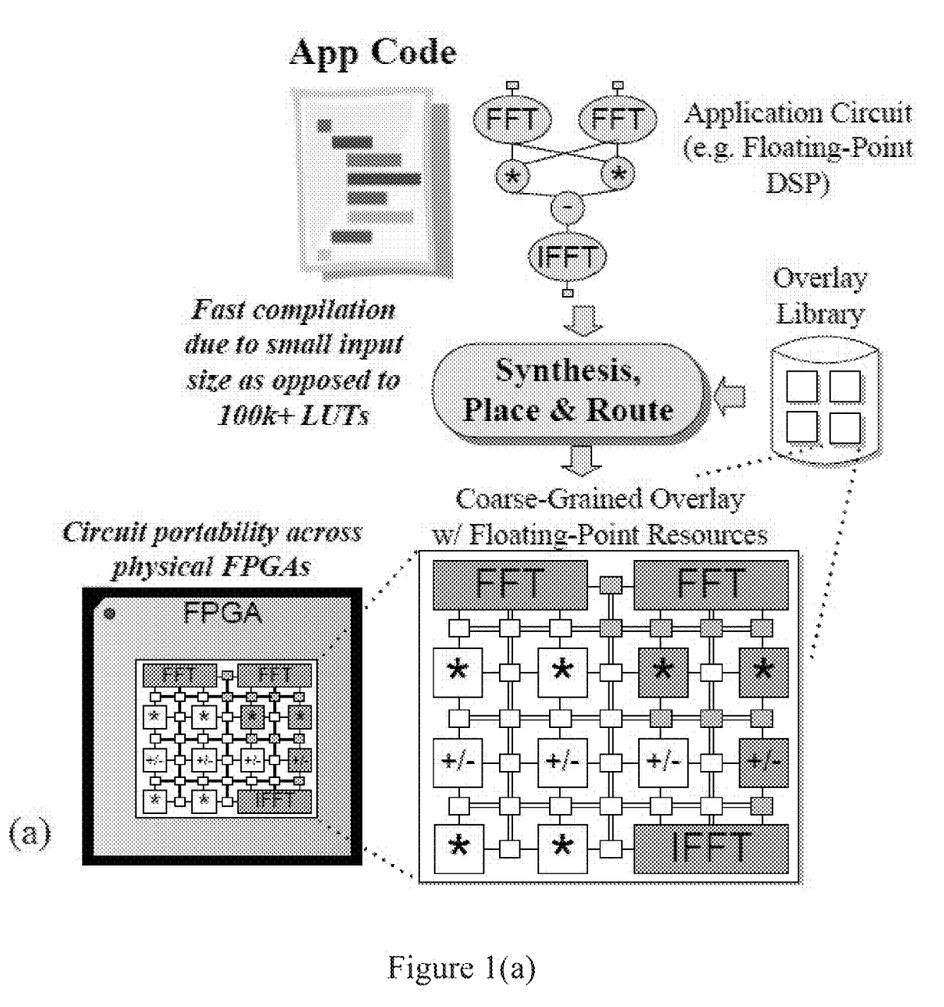
FIG. 1(a) is a schematic diagram of a uniquified virtualization approach to hardware security according to an embodiment of the present invention, and specifically demonstrates an overlay for a digital signal processing (DSP) application including floating-point operations.

Unlike the typical FPGA flow, embodiments of the present invention do not have to implement an application directly on a field-programmable gate array (FPGA). Instead, an application-specialized virtual architecture overlay can first be created that is implemented atop the FPGA. FIG. 1(a) demonstrates an overlay example for a digital signal processing (DSP) application consisting of floating-point operations. When implemented directly on an FPGA, synthesis tools decompose this application into hundreds of thousands of lookup tables (LUTs). When implemented on the illustrated overlay, the synthesis tool only has to map several coarse-grained operations onto matching hardware resources. Previous work has shown that such abstraction enables overlays to provide a number of advantages including 10,000× faster compilation, 1,000× faster reconfiguration, bitfile portability across FPGAs, simplified development and debugging, transparent high-level synthesis, and 1,000× smaller bitfiles, which is critical for IoT applications.

Figure 1B:
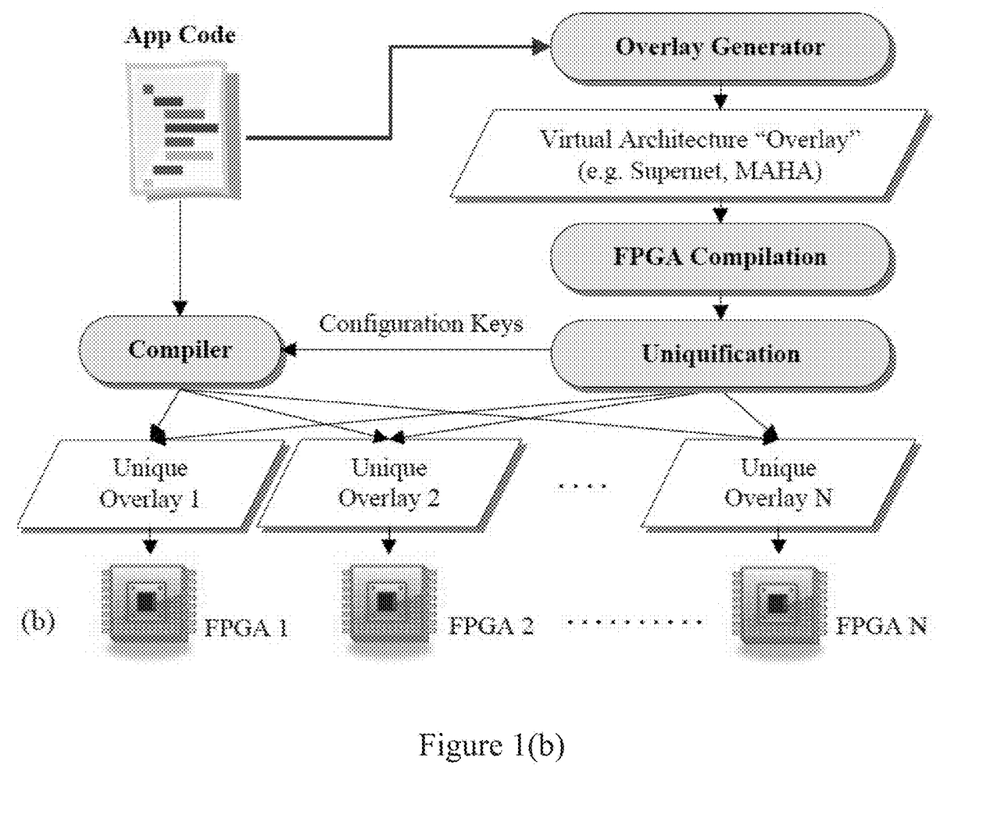
FIG. 1(b) is schematic diagram of a uniquified virtualization approach to hardware security according to an embodiment of the present invention.
Figure 3A:
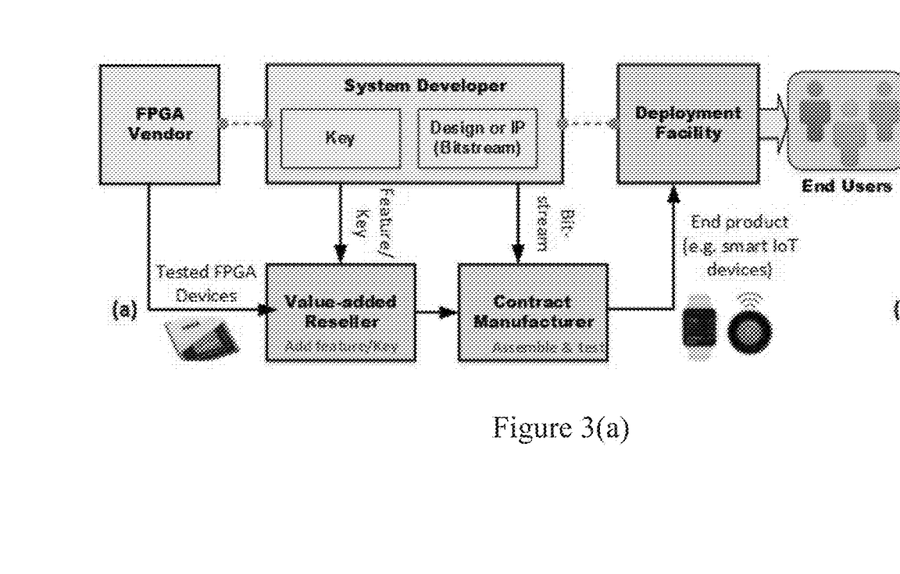
FIG. 3(a) is a flowchart of typical life cycle of FPGA-based systems and stages where attacks on bitstreams can occur (marked red).
Figure 3B:
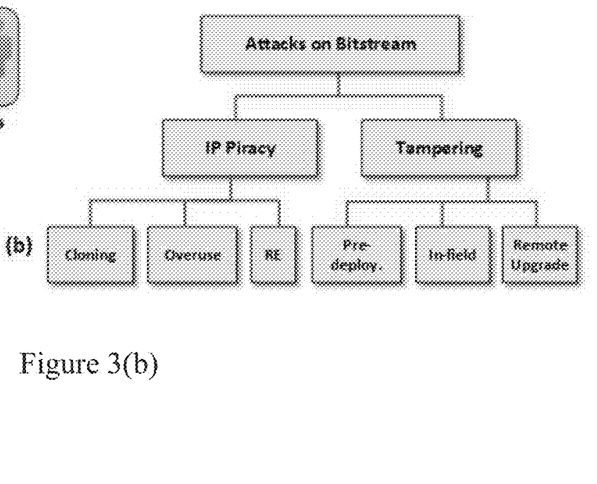
FIG. 3(b) is a diagram showing a brief taxonomy of major threats on bitstreams.

Embodiments of the present invention extend these characteristics to include improved security, as shown in FIG. 1(b). Embodiments of the present invention can initially use an overlay generator to create an application-specialized overlay. Embodiments of the present invention can achieve security via uniquification, which modifies the generated overlay with unique bitfiles for every deployed FPGA. Finally, a compiler can be used to employ configuration keys from uniquification to compile the application into an overlay bitfile that configures each unique overlay. This strategy can protect against major threats to bitstream security, as can be seen in FIG. 3.

Figure 2:
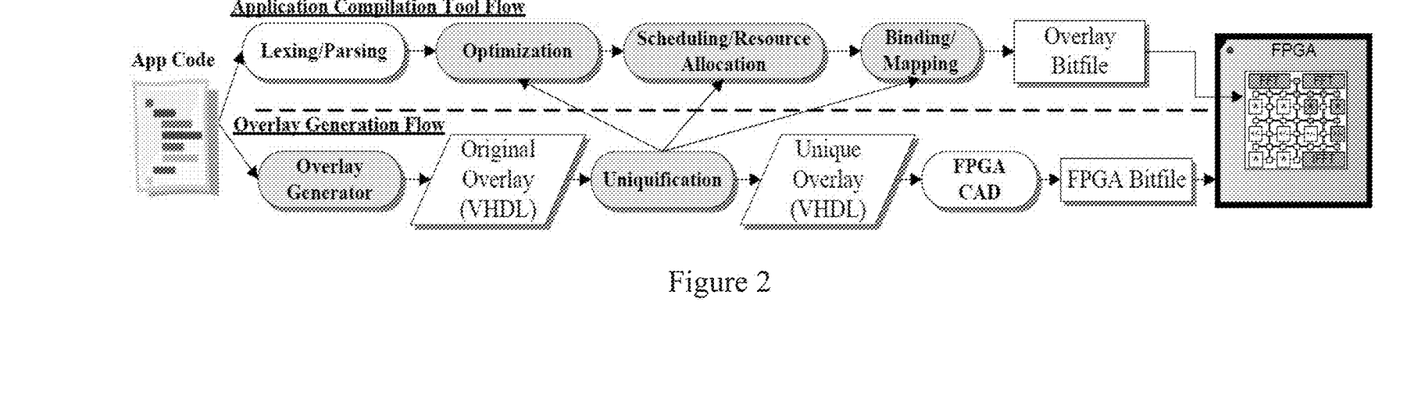
FIG. 2 is a flow chart of application compilation and overlay generation tool flows according to an embodiment of an embodiment of the present invention.

FIG. 2 illustrates a tool flow for generating overlays, and for compiling an application onto those overlays. Initially, the overlay generation flow starts with the overlay generator, which uses application code, or functions from a domain, to create an appropriate overlay represented in any hardware description language (e.g., VHDL). Uniquification then modifies that overlay as described later, resulting in a number of unique overlays, each represented in VHDL. The VHDL can then be compiled by FPGA CAD tools (e.g., Vivado, Quartus) like any other circuit, resulting in an FPGA bitfile that programs the FPGA with the overlay.

After generating an overlay, the application compilation tool flow can follow a set of steps similar to high-level synthesis and compilation, but specialized for each overlay. Specifically, optimization, scheduling, resource allocation, binding, and mapping can depend on the overlay architecture and the uniquifications. These steps can output a separate overlay bitfile that configures the overlay that is already implemented on the FPGA. The application compilation tool flow repeats every time the application is changed, but generally the overlay tool flow will only execute once to create the initial overlay, or possibly several times if application requirements change significantly.

Unique overlays do not support portable overlay bitstreams across devices by design, which requires compilation or high-level synthesis to generate a unique bitstream for every overlay. To identify the uniquifications for a particular device, the compiler uses the configuration key for each FPGA. This key/device ID pair is only known to the device and/or application manufacturer. The compiler can then guarantee by construction the correctness of the mapping because it is aware of the modifications made to the overlay for that device. Similarly, during an update, the ID can be retrieved from the device, and the corresponding key can be looked up in the manufacturer's database.

Figure 4:
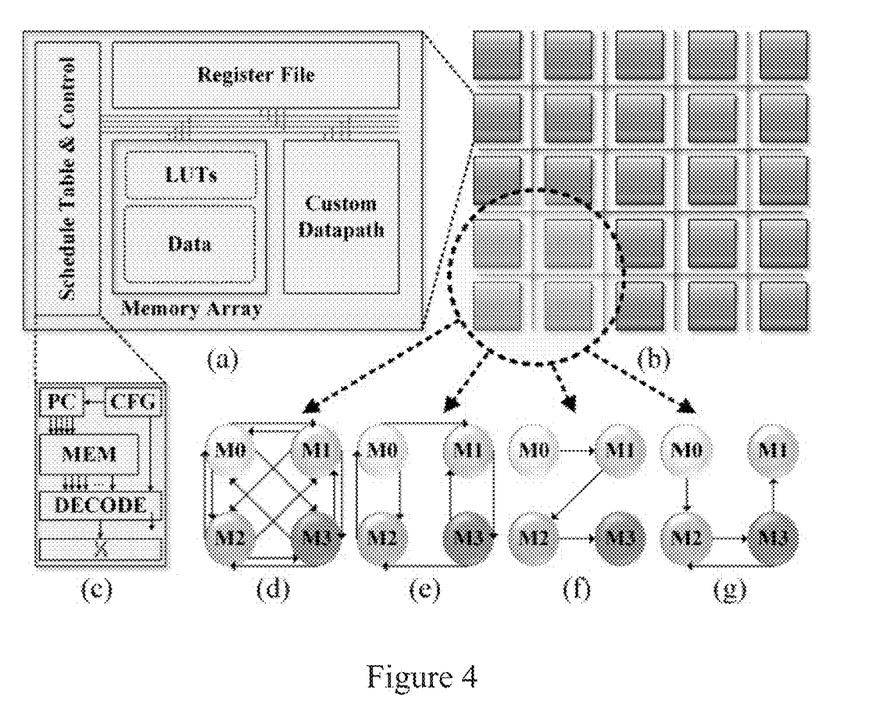
FIG. 4 is a diagram showing an overview of an MAHA overlay structure according to an embodiment of the present invention.

Although the presented security advantages can potentially be gained from any overlay, a modified Malleable Hardware (MAHA) overlay can be used, as shown in FIG. 4, to better illustrate embodiments of the present invention.

FIG. 4(a) is an overview of the MAHA architecture, with FIG. 4(b) being a set of inter-connected processing elements. FIG. 4(c) shows that individual processing elements, as well as the interconnect fabric (FIGS. 4(d)-(g)), are highly customizable, and can be utilized for increased security. Depending on the application properties, either a strongly connected (for example, FIGS. 4(d) and 4(e)) or weakly connected (for example, FIGS. 4(f) and 4(g)) interconnect can be used for parallelization or pipelining, respectively.

The basic building block of MAHA is the Memory Logic Block (MLB), as shown in FIG. 4(a). The MLB is a single-issue, single-cycle reduced instruction set computer (RISC)-style microprocessor comprised of an instruction cache, called the schedule table, a lightweight custom data path, a program counter, and an appropriately sized shared data and lookup memory.

During program execution, MAHA fetches instructions from the schedule table. Depending on the instructions, MAHA will either select a datapath result or lookup table result for a register write back. The lookup table can enable energy-efficient evaluation of complex functions, while the lightweight datapath can enable rapid execution of common functions for a domain. MAHA can use a number of MLBs interconnected in a multi-level hierarchy, the structure of which depends on the particular application. During compilation, instructions, data, and lookup table memory are spatially distributed among the MLBs, while local instructions within a given MLB execute temporally. The architecture is fully customizable for the target application, and can be implemented as an FPGA overlay using standard FPGA CAD tool flows.

The major security advantages of MAHA can be obtained via uniquification using the following modifications:

Instruction Set Randomization (ISR): modification of the instruction encoding

Instruction Order Randomization (IOR): permuting of the schedule table and program counter sequence Interconnect Randomization (ICR): modifying the inter-MLB communication network Of these, ISR can be applied to standard microprocessors for the purpose of software security, whereas IOR is more difficult to implement on a standard microprocessor due to the requirement of instruction caching. Instruction caching is not an issue with the MLB for the following reasons: 1) the schedule table size can be modified to match application requirements, and 2) applications can be mapped spatially, using additional MLBs as necessary up to the FPGA's physical resource limit. Finally, the ICR implementation depends on the MLB interconnect structure, which can vary between implementations of the overlay, and has a direct impact on the possible application mappings for that instance.

These uniquification approaches can be implemented within each MLB by making small modifications to the MLB structure. Specifically, ISR requires that either 1) a permutation network be used to permute the order of inputs to certain functional units, which does not require resynthesis, but does increase area and delay, or 2) the encoding be uniquified at the register transfer language (RTL) level, which does not affect timing, but does require resynthesis. The time required for resynthesis can vary depending on the size of the design, but in general this can be mitigated by leveraging incremental compilation to only resynthesize the small fraction of the design performing instruction decoding in each MLB. An analysis of the recompilation time with and without partitioning MAHA's instruction encoding module demonstrated a 24% average decrease in compilation time, which can make resynthesis more practical.

IOR can be implemented more simply using a cryptographically secure sequence generator, namely a maximal period nonlinear feedback shift register. The seed for this generator can be changed in the bitstream without resynthesizing the overlay.

Finally, ICR can be implemented by beginning with a fully-connected network of MLBs, and cutting specific connections between MLBs by modifying connection and switch box configuration bits in the FPGA. As long as the overlay bitfile mapping tool, which generates the instructions for the MLBs, is cognizant of the modifications (ISR, IOR, and ICR), it can create a functionally correct and latency-aware mapping with little variation in performance across all uniquified overlays.

Because a uniquified bitstream is not portable among devices, each FPGA may need to provide a device ID. Each device can have a corresponding randomly-generated configuration key that specifies all ISR, IOR, and ICR modifications. The key/device ID association is known only to the manufacturer. During an update, the ID can be retrieved from the target device, and the corresponding key can be looked up in the manufacturer's database. The compiler can then guarantee by construction the correctness of the mapped application because it is aware of the modifications made to the overlay for that device.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A computer or hardware security method comprising:

providing one or more field-programmable gate arrays (FPGAs); and creating an application specialized virtual architecture (or overlay) over the one or more FPGAs (e.g., by providing an overlay generator).

Embodiment 2. The method of embodiment 1, wherein unique bitfiles (that configure the overlays implemented on the FPGA) are provided for each deployed FPGA.

Embodiment 3. The method of any of embodiments 1 to 2, wherein the application specialized virtual architecture is constructed using application code, or functions from a domain, to create an overlay represented by one or more hardware description languages (e.g., VHDL).

Embodiment 4. The method of any of embodiments 1 to 3, further comprising compiling the overlay hardware description language using FPGA CAD tools (e.g., Vivado, Quartus), resulting in an FPGA bitfile that programs the FPGA with the overlay.

Embodiment 5. The method of any of embodiments 1 to 4, wherein, after generating the overlay, an application compilation tool flow follows a set of steps including optimization, scheduling, resource allocation, binding, and mapping, as well as compiling the unique or application-specialized overlay (depending on the overlay architecture and uniquifications).

Embodiment 6. The method of any of embodiments 1 to 5, wherein the application compilation tool flow repeats when the application is changed.

Embodiment 7. The method of any of embodiments 1 to 6, wherein the overlay tool flow executes only once to create an initial overlay.

Embodiment 8. The method of any of embodiments 1 to 7, wherein the overlay tool flow executes multiple times (e.g., if application requirements change).

Embodiment 9. The method of any of embodiments 1 to 8, further comprising providing a compiler that uses a configuration key for each FPGA (a key/device ID pair) to identify uniquifications for a particular device.

Embodiment 10. The method of any of embodiments 1 to 9, wherein the key/device ID pair is only known to the device manufacturer, or the application manufacturer, or both.

Embodiment 11. The method of any of embodiments 1 to 10, wherein the compiler ensures correctness of mapped applications by construction (by being aware of the modifications made to the overlay for that device).

Embodiment 12. The method of any of embodiments 1 to 11, wherein the ID can be retrieved from the device during an update and the corresponding key is referenced in the manufacturer's database.

Embodiment 13. The method of any of embodiments 1 to 12, wherein the overlay is a Malleable Hardware (MAHA) overlay or equivalent overlay (or alternative overlay).

Embodiment 14. The method of any of embodiments 1 to 13, wherein the overlay (e.g. MAHA overlay) incorporates Memory Logic Blocks (MLBs).

Embodiment 15. The method of any of embodiments 1 to 14, wherein uniquification is achieved using one or more of the following modifications: Instruction Set Randomization (ISR)—modification of the instruction encoding; Instruction Order Randomization (IOR)—permuting of the schedule table and program counter sequence; and Interconnect Randomization (ICR)—modifying the inter-MLB communication network.

Embodiment 16. The method of any of embodiments 1 to 15, wherein uniquification is implemented within each MLB.

Embodiment 17. The method of any of embodiments 1 to 16, wherein ISR includes permuting the order of input to functional units and/or encoding is uniquified at the register transfer language (RTL) level.

Embodiment 18. The method of any of embodiments 1 to 17, wherein incremental compilation is applied to only resynthesize the fraction of the design (or overlay) performing instruction decoding in each MLB.

Embodiment 19. The method of any of embodiments 1 to 18, wherein IOR is implemented using a cryptographically secure sequence generator (e.g., a maximal period nonlinear feedback shift register).

Embodiment 20. The method of any of embodiments 1 to 19, wherein the seed for the cryptographically secure sequence generator is changed in the bitstream without resynthesizing the overlay.

Embodiment 21. The method of any of embodiments 1 to 20, wherein the ICR is implemented by beginning with a fully-connected network of MLBs, and cutting specific connections between MLBs by modifying connection and switch box configuration bits in the FPGA. (ICR, IOR, and ISR are fairly specific to MAHA. If the overlay is an alternative overlay, then these three may not apply, but alternative methods for uniquification would be available which are specific to that overlay.)

Embodiment 22. The method of any of embodiments 1 to 21, wherein the overlay bitfile mapping tool, which generates the instructions for the MLBs, is cognizant of the modifications (ISR, IOR, and ICR) and creates a functionally correct and latency-aware mapping (allowing for little variation in performance across all uniquified overlays).

Embodiment 23. The method of any of embodiments 1 to 22, wherein each FPGA provides a device ID.

Embodiment 24. The method of any of embodiments 1 to 23, wherein each device has a corresponding randomly-generated configuration key that specifies all ISR, IOR, and ICR modifications.

Embodiment 25. The method of any of embodiments 1 to 24, wherein the method includes generating an application-specialized overlay, and then compiles the application-specialized overlay using FPGA CAD tools.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLE 1

To gain a better understanding of and prove the concepts underlying embodiments of the present invention, an overhead analysis was conducted. Specifically, the energy, performance, and area were evaluated on a 40 nm Stratix IV FPGA, both with and without an MAHA overlay. Vector-based dynamic/total power and clock frequency were measured using Altera Quartus II. To evaluate the overlay, 10 benchmarks from image/signal processing and security domains were chosen, then functional correctness of each benchmark was verified using Altera ModelSim with 10,000 input vectors. For each benchmark, specialized overlays were generated by 1) adding/removing MLBs (up to 8), 2) optimizing the bitstream size by customizing the lookup table and schedule table sizes, and 3) specializing the datapath block. Our compiler generated all instructions for each specialized instruction set. The execution time of each benchmark was calculated based on the number of cycles needed, multiplied by the clock period as determined by TimeQuest Timing Analyzer.

Table I compares the MAHA overlay with direct FPGA implementations. On average, the MAHA overlay obtained its security advantages at a cost of 1.5× execution time, 1.9× energy, and 1.7× power. The energy-delay-product increase from the MAHA overlay was 2.8×. MAHA reduced bitstream sizes by an average of 2,190×, while using 855 LUTs on average, compared to 255 for the FPGA—an average LUT increase of 3.4×. Although this ratio may seem significant, it is inflated due to the FPGA circuits being extremely small. Furthermore, the FPGA circuits are application specific, whereas the overlay has flexibility to implement other applications, which suggests not all these extra LUTs were overhead.

EXAMPLE 2

To further explain and prove the concepts underlying embodiments of the present invention, a security analysis was conducted.

Qualitatively, the overlay acts as an obfuscation layer which makes it more difficult for an attacker to reverse engineer the design. Namely, an adversary needs the following information to attack the system:

1) access to the uniquified FPGA bitstream, and knowledge of its format (e.g. location and meaning of LUT content bits and routing information)

2) access to the overlay bitfile, and knowledge of its format (e.g. instruction format, location of LUT content), which varies among all devices The potential impact from the diversification approaches of embodiments of the present invention was then analyzed. Quantitatively, the level of security against brute force attacks, defined as the number of brute force attempts required to reverse engineer the IP mapped to the overlay, is fairly straightforward for ISR and IOR:

ISR: $2^n$, where n is the instruction bitwidth

IOR: m!, where m is the size of the schedule table

This is because there are $2^n$ possible binary encodings for an n-bit instruction, and the order of the m instructions in a given MLB can be permuted in m! ways. Furthermore, the particular implementations of ISR and IOR used can differ among all K MLBs in the system. During application mapping, nodes from the CDFG are distributed among all available MLBs. Therefore, a functionally correct mapping can only be realized with proper execution within each MLB. Therefore, the overall security from these two approaches is an exponential function of the number of MLBs, as shown in Equation 1:

$$S_1(n, m, K) = \prod_{j=1}^{K} 2^n \times m_j!  \quad (1)$$

This expression assumes that the size of the schedule table may differ between MLBs, but the instruction width is constant.

The security provided by ICR depends not only on the number of MLBs, but also on their particular interconnect configuration, to which variations will result in different mappings and different power/performance/area tradeoffs. For demonstration, consider K identical, fully connected MLBs, and an application which is perfectly parallelizable. For each application mapping, the total number of possible placements is K! because for any given mapping, a particular subgraph of the original CDFG may be placed into any MLB, and only the routing, encoded within the instructions, needs to be updated to match. In other words, the fully connected network of identical MLBs is isomorphic, and therefore the placement algorithm is free to assign any subgraph to any MLB. For security purposes, the isomorphism is not ideal, because the overlay bitfiles will not differ significantly.

sufficient schedule table and lookup table memory, the entire application can be mapped into the single MLB. For K>1, it follows that either 1) a portion of the application can be parallelized, or 2) that the application is implemented in a pipeline fashion. In the first case, the particular subgraphs can be mapped to any available MLB, as long as partial or intermediate results may be communicated between any two MLBs (even over multiple cycles), which is true if the network is strongly connected. If instead multiple MLBs are used for pipelining, then the application can be divided into sequential subgraphs, each of which can be placed in adjacent MLBs along the direction of the given edge. Thus, pipelining requires only a weakly connected network of MLBs with an extant path from PI to PO. Therefore,

TABLE I

ENERGY, PERFORMANCE, AND SIZE OF MAPPED APPLICATIONS, WITH AND WITHOUT MAHA OVERLAY

| | Execution Time (µs) | | | Dynamic Energy (nJ) | | | Total Energy (nJ) | | | Bitstr. Size (b) | | Comb. ALUTs | | Total Mem. (b) | |
| --- | --- | --- | --- | --- | --- | --- | --- | --- | --- | --- | --- | --- | --- | --- | --- |
| | MAHA | FPGA | Ratio | MAHA | FPGA | Ratio | MAHA | FPGA | Ratio | MAHA | FPGA | MAHA | FPGA | MAHA | FPGA |
| CI | 0.24 | 0.29 | 0.83 | 3.98 | 2.24 | 1.78 | 8.04 | 6.76 | 1.19 | 4368 | 10.9M | 1227 | 87 | 36216 | 1920 |
| FIR | 0.21 | 0.20 | 1.05 | 3.16 | 1.58 | 2.00 | 6.96 | 4.47 | 1.56 | 3440 | 10.9M | 887 | 101 | 29384 | 1920 |
| AES | 5.23 | 2.56 | 2.04 | 96.67 | 41.82 | 2.31 | 210.01 | 102.08 | 2.06 | 7456 | 10.9M | 824 | 771 | 60016 | 1920 |
| DES | 4.51 | 2.50 | 1.80 | 77.32 | 37.45 | 2.06 | 182.81 | 98.43 | 1.86 | 13392 | 10.9M | 831 | 104 | 97280 | 1920 |
| DCT | 0.78 | 0.44 | 1.77 | 11.05 | 5.67 | 1.95 | 25.92 | 13.06 | 1.98 | 3728 | 10.9M | 1690 | 90 | 39108 | 1920 |
| SHA | 12.26 | 5.13 | 2.39 | 179.43 | 80.0 | 2.24 | 351.37 | 200.75 | 1.75 | 5828 | 10.9M | 1073 | 959 | 20480 | 1920 |
| TM | 0.11 | 0.10 | 1.10 | 1.53 | 0.98 | 1.56 | 3.66 | 2.48 | 1.48 | 2288 | 10.9M | 754 | 60 | 19208 | 1920 |
| LFSR | 0.12 | 0.09 | 1.33 | 1.43 | 0.74 | 1.93 | 2.99 | 2.34 | 1.28 | 1136 | 10.9M | 378 | 90 | 10056 | 1920 |
| BF | 3.10 | 2.11 | 1.47 | 56.39 | 31.39 | 1.80 | 140.06 | 75.14 | 1.86 | 4784 | 10.9M | 800 | 199 | 38952 | 1920 |
| THR | 0.19 | 0.20 | 0.95 | 3.06 | 1.91 | 1.60 | 67.99 | 47.05 | 1.45 | 3344 | 10.9M | 89 | 89 | 27640 | 1920 |
| Avg | 2.66 | 1.36 | 1.47 | 43.4 | 20.39 | 1.92 | 99.98 | 55.26 | 1.65 | 4976 | 10.9M | 855 | 255 | 37843 | 1920 |

Other mappings based on different interconnections are possible. These other mappings will change not just the routing portion of the instructions, but also the application mapping itself. For example, in FIG. 4(e), there is a path from M 1↔M3→M 2↔M 0. Compared with an equivalent mapping on FIG. 4(d), removal of the M 1→M 0 adjacency will either change the mapping entirely, or modify it by using M3 and M 2 to pass required data.

Given that different interconnect configurations will result in different mappings, ICR has profound implications for system security through overlay diversification, as long as there is at least one functionally correct mapping for those interconnect configurations made possible through ICR. If this is true, then the total number of possible mappings would be equal to the number of interconnect configurations for K MLBs. Computing this is nontrivial, and is given by $$S_2(K) = A[K] \quad (2)$$

where A is the OEIS sequence A035512, the 13th term of which is roughly $2^{123}$. It is assumed that the digraph is unlabeled, because as with the example of K fully connected MLBs, isomorphic configurations do not contribute significantly to security.

In fact, it can be shown that for every interconnect configuration, there is at least one functionally correct application mapping, given that the particular configuration satisfies the requirements for a strongly connected digraph, and the per-MLB schedule and LUT memory size constraints are relaxed. By extension, if the interconnect is only weakly connected, this holds as long as there is a path from the MLB processing the CDFGs primary input (PI) to the MLB processing its primary output (PO), as shown in FIGS. 4(f) and (g).

To prove this, first consider the case of one MLB (K=1). By definition, a single MLB is a connected graph, and with regardless of the application properties, there is at least one functionally correct mapping for every interconnect configuration, giving us Equation 2.

There can be security tradeoffs in design mapping. From Equation 1, it follows that, for highly parallelizable applications, the overall level of brute force security may decrease as more MLBs are added when only ISR and IOR are used. This is because an increase in K will usually result in an overall reduction in the size of m, since a smaller schedule table will be needed when instructions are distributed among a greater number of MLBs, causing a reduction in brute force security for certain values of m and K. For example, $S_1(32, 56, 1) = 2^{281}$. Assuming that the application is not perfectly parallelizable, it can be divided into two MLBs, each of which has 30 (instead of 28) instructions. This gives us $S_1(30, 32, 2) = 2^{279}$. Similarly, ICR is effective against brute force only when K≥14; below that, the number of brute force attempts will be below $2^{128}$. Also, when an application is mapped to a network which is a subset of another, without ISR and IOR, the overlay bitfile will function on both devices. For example, the application mapped to FIG. 4(e) would function properly on FIG. 4(d), but the converse is not necessarily true, as the connections in FIG. 4(e) are a subset of those found in FIG. 4(d). However, combining the three approaches is multiplicative, since the connectivity is independent of the internal MLB security expressed in Equation 1; thus, combining these architectural modifications gives us $$S_3(n, m, K) = S_1(n, m, K) \times S_2(K) \quad (3)$$

In short, the system security for small values of K requires both ISR and IOR, and the potentially reduced security from ISR and IOR for small values of m is partially compensated by the presence of ICR. Therefore, the architectural modifications of embodiments of the subject invention provide a powerful and versatile tool for security through diversification for the FPGA overlay.

The goal for a typical side channel attack is to obtain secret information, such as an encryption key, by carefully observing certain time-varying system properties, such as power consumption or electromagnetic radiation. The reason such attacks are effective is that these side channels inadvertently leak information because certain operations take more or less power, depending on if the bits involved are 1 or 0. By comparison, the overlay does not rely on operations with secret keys; instead, the particular modifications are encoded into the architecture of the overlay itself. In other words, there is no secret key to leak, making the overlay approach highly effective against side-channel attacks.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] J. Coole and G. Stitt, "Intermediate fabrics: Virtual architectures for circuit portability and fast placement and routing," in *IEEE/ACM/IFIP International Conference on Hardware/Software Codesign and System Synthesis*, ser. CODES/ISSS '10. ACM, 2010, pp. 13-22.

[2] W. Luis, G. R. Newell, and K. Alexander, "Differential power analysis countermeasures for the configuration of sram fpgas," in *Military Communications Conference, MILCOM 2015-2015 IEEE*, October 2015, pp. 1276-1283.

[3] J. Coole and G. Stitt, "Fast, flexible high-level synthesis from opencl using reconfiguration contexts," *IEEE Micro*, vol. 34, no. 1, pp. 42-53, January 2014.

[4] J. Coole, "Adjustable-cost overlays for runtime compilation," in *Field-Programmable Custom Computing Machines (FCCM), 2015 IEEE 23rd Annual International Symposium on*, May 2015, pp. 21-24.

[5] S. Paul, A. Krishna, W. Qian, R. Karam, and S. Bhunia, "Maha: An energy-efficient malleable hardware accelerator for data-intensive applications," *IEEE Transactions on Very Large Scale Integration (VLSI) Systems*, September 2014.

[6] A. K. Jain, S. A. Fahmy, and D. L. Maskell, "Efficient overlay architecture based on dsp blocks," in *Field-Programmable Custom Computing Machines (FCCM), 2015 IEEE 23rd Annual International Symposium on*. IEEE, 2015, pp. 25-28.

[7] D. Capalija and T. S. Abdelrahman, "A high-performance overlay architecture for pipelined execution of data flow graphs," in *2013 23rd International Conference on Field programmable Logic and Applications*. IEEE, 2013, pp. 1-8.

[8] G. S. Kc, A. D. Keromytis, and V. Prevelakis, "Countering code-injection attacks with instruction-set randomization," in *Proceedings of the 10th ACM conference on Computer and communications security*. ACM, 2003, pp. 272-280.

[9] "Number of unlabeled strongly connected digraphs with n nodes." [Online]. THE ONLINE ENCYCLOPEDIA OF INTEGER SEQUENCES (OEIS), Sequence number: A035512.

What is claimed is:

1. A method of programming a plurality of field-programmable gate arrays (FPGAs), the method comprising:
   generating a first overlay from an application code adapted to program the plurality of FPGAs;
   generating, from the first overlay, a plurality of unique overlays each associated with a different one of the FPGAs and each using a configuration key associated with the FPGA;
   generating a first set of bitfiles each associated with a different one of the unique overlays; and
   programming the plurality of the FPGAs using the first set of bitfiles.

2. The method of claim 1, wherein the first overlay is constructed using the application code, or functions from a domain, to create an overlay represented by one or more hardware description languages.

3. The method of claim 2, further comprising compiling an overlay hardware description language using FPGA CAD tools, resulting in an FPGA bitfile that programs the FPGA with the overlay.

4. The method of claim 1, wherein, after generating each of the unique overlays, an application compilation tool flow follows a set of steps including optimization, scheduling, resource allocation, binding, and mapping to generate the corresponding bitfile that programs the corresponding FPGA.

5. The method of claim 4, wherein the application compilation tool flow repeats if an application is changed.

6. The method of claim 1, wherein an overlay tool flow executes only once to create an initial overlay.

7. The method of claim 1, wherein an overlay tool flow executes more than once if application requirements change.

8. The method of claim 1, wherein generating the plurality of unique overlays from the first overlay is achieved using one or more of the following modifications: Instruction Set Randomization, Instruction Order Randomization, and Interconnect Randomization.

9. The method of claim 1 further comprising:
   compiling a hardware description language representative of the first overlay to generate a second set of bitfiles; and
   programming the plurality of the FPGAs using the second set of bitfiles.

* * * * *